P. JARDINE.
COLLAPSIBLE TAP.
APPLICATION FILED OCT. 30, 1919.
1,362,799.
Patented Dec. 21, 1920.
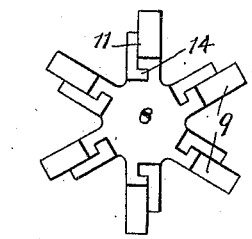
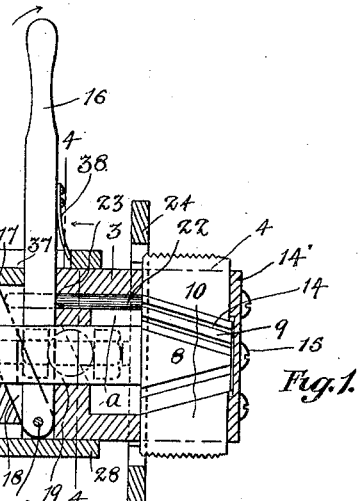
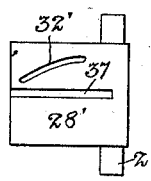
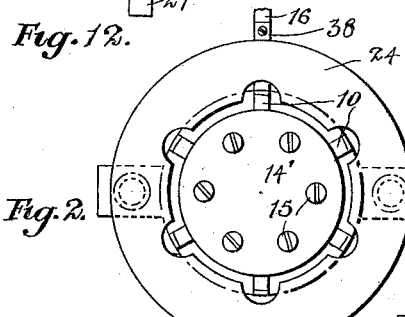
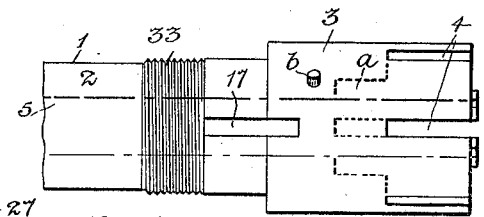
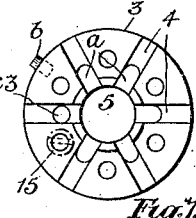
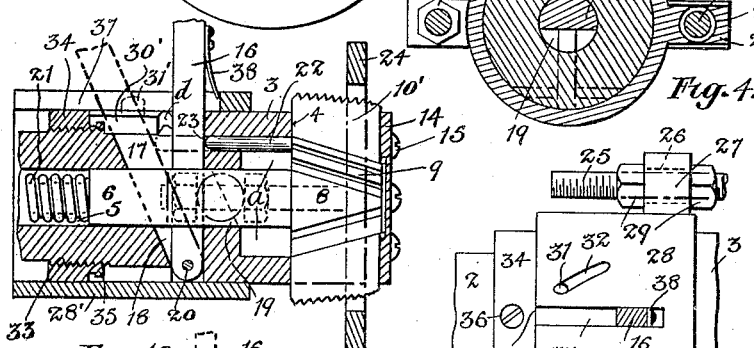
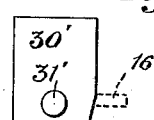
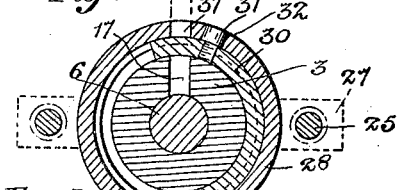
Inventor
P. Jardine
Egerton N. Case
Attorney

UNITED STATES PATENT OFFICE.

PETER JARDINE, OF HESPELER, ONTARIO, CANADA, ASSIGNOR TO A. B. JARDINE & COMPANY, LIMITED, OF HESPELER, ONTARIO, CANADA.

COLLAPSIBLE TAP.

1,362,799.  Specification of Letters Patent.  Patented Dec. 21, 1920.

Application filed October 30, 1919. Serial No. 334,387.

*To all whom it may concern:*

Be it known that I, PETER JARDINE, a subject of the King of Great Britain, of the town of Hespeler, county of Waterloo, Province of Ontario, Canada, have invented certain new and useful Improvements in Collapsible Taps, of which the following is a specification.

My invention relates to improvements in collapsible taps, and relates more particularly to a tap of this class which can be used for threading parallel and tapered bores or holes, and one object of the invention is to securely lock the component parts of the tap in expanded position and to provide automatic means whereby the said component parts are unlocked and fully collapsed at the proper time irrespective of the character of the work the tool may be doing. Another object of the invention is to permit the component parts of the tap to be manually re-set by one operation and so quickly positioned for use, at which time the parts of the tap are locked. A still further object of the invention is to make the tool adjustable so that the component parts of the tap may be adjusted to tap holes or bores of different diameters, and in the following specification, and the drawings forming part thereof, I shall set forth the movements necessary to effect the objects in view and the preferred means used to secure these movements for doing two classes of work, and what I claim as new will be pointed out in the claims forming part of this specification.

Figure 1 is a longitudinal vertical section through my tool showing the same adapted for tapping parallel holes or bores. Fig. 2 is an elevation of the front end of the tool. Fig. 3 is a plan view of the major portion of the tool body. Figs. 4 and 5 are vertical cross sections on the lines 4—4, and 5—5, respectively, Fig. 1. Fig. 6 is a plan view of the cam sleeve, and certain parts associated therewith. Fig. 7 is an elevation of the front end of the tool body. Fig. 8 is an elevation of the front end of the plunger head which carries the cutters. Fig. 9 is an end elevation of one of the cutters of the tap. Fig. 10 is a longitudinal vertical section through the major portion of the front end of my tool showing the same adapted for tapping tapered holes or bores. Fig. 11 is a plan view of a modified form of keeper used with my tool when tapping tapered bores or holes, and Fig. 12 is a plan view of the cam-sleeve used with my tool when tapping tapered bores or holes.

In the drawings, like characters of reference refer to the same parts.

The present tool is designed to be held stationary, and it will be understood that the work to be tapped must be rotated and fed forward.

1 is the tool body, and the same comprises a shank 2, which is designed to be held in any suitable support (not shown). 3 is the head of the tool body, and this head is provided with a plurality of radially-disposed slots 4 opening into the bore 5. Mounted to operate within the bore 5 is a plunger 6, which is provided with a head 8. The said head is provided with a plurality of radially-disposed members 9 which are located opposite the slots 4. 10 are the cutters, and the same occupy the slots 4. These cutters, together with the members 9 carried by the plunger, form the collapsible tap. In order that the said cutters may be expanded and contracted as the plunger 6 is moved longitudinally in the bore 5, I provide any suitable means whereby the movement of the members 9 is transmitted to the cutters 10. The preferred means for this purpose consists in providing each member 9 with a flange 11 which fits a correspondingly-shaped groove 12 formed in each cutter 10. 13 is a flange forming part of each cutter 10, and each flange 13 operates in one of the grooves 14 formed in the members 9. It will be observed upon referring particularly to Figs. 1 and 8, that the said members 9 are disposed at an angle to the longitudinal axis of the tool and that they converge toward the forward end of the tool. The inner edges of the cutters 10 are also similarly disposed.

The cutters 10 are retained in place by any suitable means such as a plate 14' secured to the outer end of the head 3 by any suitable means such as screws 15. The said plate closes the forward ends of the slots 4, and it will be seen upon referring particularly to Fig. 1, that the said cutters are co-extensive with the length of said slots 4 and have sliding movement with the walls thereof. 16 is a lever which extends through alined slots 17 and 18 formed in the shank 2. These slots open into the bore 5. The said lever also extends through a slot 19, formed in the plunger 6, and is pivoted to the head 3 of the tool body, by any suitable element such as a pin 20. The slots 17 and 18 are tapered, substantially as shown, so as to allow for the necessary movement of the lever 16. 21 is an extension spring or equivalent means, anchored by any suitable means preferably to the end of the shank 2. This spring 21, or equivalent means, exerts power continually to withdraw the plunger 6 and its head 8 into the tool body, and in order to maintain the said plunger and head 8 in the position illustrated in Fig. 1, I use any suitable means such as a pin 22 which is in alinement with one of the slots 4. This pin is held in a hole 23 formed in the head 3 of the tool body, which hole opens into the slot 17. In the position of the parts illustrated in Fig. 1, the pin 22 abuts against one of the members 9 of the head 8 and is held against the lever 16 which, in the position illustrated, is locked against movement, and it will, therefore, be understood that in the said position of the said parts, the pin 22 prevents the spring 21 from withdrawing the plunger 6 and head 8 into the tool body.

As before mentioned, the cutters 10 are for the purpose of tapping a parallel hole or bore, and as this tool is held stationary, the work (not shown) must be advanced toward said cutters and at the same time rotated. When the work is about fully tapped, it comes in contact with a tripping plate 24 which preferably is made to surround the head 3, and is suitably formed to allow for clearance therewith of the cutters 10. 25 are a pair of thrust rods coupled to the said plate 24 and positioned one at each side of the tool, and these thrust rods pass through a hole 26 (with which they preferably have clearance) formed in lugs 27 carried by the cam-sleeve 28 which embraces the tool-body. By means of nuts, or other equivalent means 29, screwing on the threaded thrust rods 25, the said thrust rods are adjustably held in the lugs 27. 30 is a keeper (see Figs. 1 and 5) which fits against the tool body, and operates within the cam-sleeve 28. This keeper is preferably in the form of a semi-circular sleeve, and it will be seen particularly upon referring to Figs. 1 and 5, that when the parts occupy the position illustrated portion of the keeper 30 is in the path of movement of the lever 16. It will, therefore, be understood that the thrust of the pin 22 against the lever 16 is opposed by the keeper 30. 31 is a stud carried by the keeper 30, and the same extends into a slot 32 formed in the cam-sleeve 28 so as to occupy an angle to the longitudinal axis of said cam-sleeve. So soon as the work (not shown) comes in contact with the tripping plate 24, this tripping plate is moved backward and through the medium of the rods 25, and associated parts, the cam-sleeve 28 is moved longitudinally of the tool, and through the coaction between the stud 31 and slot 32, the keeper 30 is moved around the longitudinal axis of the tool, until it is moved out of the path of movement of the lever 16, at which time the spring 21 withdraws the plunger 6 and head 8 and so collapses the tap. By the time the keeper 30 releases the lever 16, the cutters 10 of course have completed their work.

Screwing on the threaded portion 33 of the tool body is an adjustable nut 34, which is interlocked, after any suitable manner, as shown at 35 with the keeper 30 so as to allow for the described movement of the said keeper. This adjusting nut 34 is locked in position by any suitable means such as the set screw 36, and while it functionates to retain the keeper 30 against longitudinal movement, it is interlocked therewith as before described, so that the tap may be adjusted to tap holes or bores of different diameters within its capacity. By turning the adjusting nut to the left, the keeper 30 will be drawn backwardly thus permitting movement of the lever 16 under pressure from the pin 22 which, in turn, is moved by pressure thereagainst of the head 8 brought into action through the tension spring 21. The movement of the said head 8 will withdraw the cutters 10 the required amount.

The lever 16 operates through a slot 37 formed in the cam-sleeve 28, and in order to expand the tap, the lever 16 is moved by hand in the direction indicated by arrow from the dotted position. This movement of the said lever moves the pin 22 from its dotted position forward, and as the head 8 is constantly in contact with said pin, the said head and plunger 6 are moved forward against the spring 21, thus moving outwardly the cutters 10. Simultaneously the described movement takes place, the lever 16 actuates the cam-sleeve 28, and through the co-action between the stud 31 and slot 32, the keeper 30 is moved back to normal position into the path of movement of the lever 16. The described movement, of course, is substantially simultaneous with the outward movement of the cutters 10.

38 is a spring attached to the lever 16, which spring rests against the closed end of the slot 37. This spring eases contact between the lever 16 and cam-sleeve 28.

$a$ are the inner ends of the slots 4, and it is the space formed by these inner ends into which the members 9 pass when the tap is collapsed.

The cam sleeve 28 has movement only longitudinally of the tool body, and to prevent rotary movement thereof, any suitable means is employed. The preferred means comprises a stud $b$ carried by the head 3, and this stud operates in a key-way *c* formed in the inner side of the cam-sleeve 28.

The preferred means for coupling the spring 21 to the shank 2 is to suitably couple the bolt 39 to said spring, and to countersink the head 40 and said bolt in the outer end of the shank 2. There is nothing new in the construction just mentioned, but it will be understood that it is a convenient way of adjusting the tension of said spring.

My tool as just described is adapted for tapping parallel holes or bores. Now to adapt it for tapping tapered holes or bores, I must use tapered cutters 10', and these are placed on the plunger head 8 after the plate 14' is removed. Obviously the cutters 10' must be withdrawn as the tapping of the tapered hole or bore proceeds, and to time the proper withdrawal of the said cutters, the tripping plate 24 must be moved into substantially the position shown in Fig. 10 before the tool is put to work. Since the threaded rods 25 are long enough, this adjustment in position of the tripping plate 24 can be readily effected.

It logically follows that before the cutters 10' can be withdrawn, the lever 16 must be given a backward movement simultaneously with the required movement of the said cutter. Now to effect this movement, a modified form of keeper 30' must be substituted for the keeper 30, and a modified form of cam-sleeve 28' must be substituted for the cam-sleeve 28. This change in elements occurs at the same time the cutters 10' replace the cutters 10. The normal position of the lever 16 in respect of the keeper 30' is as shown in Figs. 10 and 11, and it will be observed that the said lever rests against the beveled face *d* of the keeper 30'. The stud 31' of the keeper 30' operates in the slot 32' of the cam-sleeve 28', and as the inward movement of the cutters 10' is continuous during the tapping operation, the cam-sleeve 28' will necessarily be moved a greater distance than the cam-sleeve 28, and, therefore, the slot 32' must be longer than the slot 32. The length of the beveled face *d* is such that the keeper 30' will have been moved out of the path of movement of the lever 16 by the time the cutters 10' have fully performed their function and so permit of the complete collapse of the tap.

The parts in the tool just described are of course re-set in the manner before described.

This specification discloses a durable, yet inexpensive tool. Any parts that are broken can be readily replaced without much trouble.

While I have described what I consider to be the best embodiment of my invention, I desire it to be understood that the principle can be embodied in different forms, and I desire not to be limited beyond the requirements of the prior art, and the terms of my claims.

What I claim is,

1. A tool of the class described comprising a bore-provided body provided with a head having a chamber extending longitudinally thereof, and opening into said bore; a spring-provided plunger mounted in said bore; a tapered head carried by said plunger and operating in the said chambered head; a plurality of radially-disposed cutters mounted in said chambered head and adapted to co-act with said tapered head so as to be contracted and expanded through the movement of said plunger; an adjusting-nut embracing said body and adapted to be adjustable thereon; a keeper mounted to be moved around the axis of said tool and adapted to be coupled to said nut so that said keeper may be adjusted longitudinally of said tool to adjust said cutters to tap holes of various diameters; re-setting means associated with said tool and designed to be locked by said keeper to hold said plunger and its head in forward position so as to hold said cutters in expanded position, and means moved longitudinally of the tool by the work after it is tapped and adapted to move said keeper out of the path of movement of said locking means so as to release said plunger and allow the spring to withdraw the same and collapse said cutters.

2. A tool of the class described comprising a bore-provided body provided with a head having a chamber extending longitudinally thereof, and opening into said bore; a spring-provided plunger mounted in said bore; a tapered head carried by said plunger and operating in the said chambered head; a plurality of radially-disposed cutters mounted in said chambered head and adapted to co-act with said tapered head so as to be contracted and expanded through the movement of said plunger; an adjusting-nut embracing said body and adapted to be adjustable thereon; a keeper mounted to be moved around the axis of said tool and adapted to be coupled to said nut so that said keeper may be adjusted longitudinally of said tool to adjust said cutters to tap holes of various diameters; re-setting means associated with said tool and designed to be locked by said keeper to hold said plunger and its head in forward position so as to hold said cutters in expanded position; a sleeve mounted on said tool body and adapted to only have longitudinal movement thereon, and inclosing said keeper; means whereby as said sleeve is moved longitudinally of said tool said keeper is moved around the axis of said tool into or out of the path of movement of said re-setting means for the purpose specified, and a tripping member coupled to said sleeve and located adjacent said cutters whereby as the work comes in contact therewith, the same is moved to move said sleeve, for the purpose specified.

3. A tool of the class described comprising a bore-provided body provided with a head having a chamber extending longitudinally thereof, and opening into said bore; a spring-provided plunger mounted in said bore; a tapered head carried by said plunger and operating in the said chambered head; a plurality of radially-disposed cutters mounted in said chambered head and adapted to co-act with said tapered head so as to be contracted and expanded through the movement of said plunger; a keeper mounted to be moved around the axis of said tool; re-setting means associated with said tool and designed to be locked by said keeper to hold said plunger and its head in forward position so as to hold said cutters in expanded position; a sleeve mounted on said tool body and adapted to only have longitudinal movement thereon, and inclosing said keeper; means whereby as said sleeve is moved longitudinally of said tool said keeper is moved around the axis of said tool into or out of the path of movement of said re-setting means; a tripping member coupled to said sleeve and located adjacent said cutters whereby as the work comes in contact therewith, the same is moved to move said sleeve, and an adjusting nut carried by said body and associated with said keeper whereby said plunger can be moved in order to adjust said cutters to tap holes of different diameters.

4. A tool of the class described comprising a bore-provided body provided with a head having a chamber extending longitudinally thereof and opening into said bore, and further provided with two alined slots opening transversely into said bore; a spring-provided plunger mounted in said bore; a tapered head carried by said plunger and operating in the said chambered head; a lever pivoted to said body and operating through said slots, and adapted to have clearance with said plunger; movable means mounted in said plunger and designed to extend from said lever to said tapered head to hold said plunger in its forward position when said lever is locked; a plurality of radially-disposed cutters mounted in said chambered head and adapted to co-act with said tapered head so as to be contracted and expanded through the movement of said plunger; a keeper mounted on said body and normally extending into the path of movement of said lever; a sleeve provided with two slots surrounding said tool-body and housing said keeper, the said lever extending through one of the slots in said sleeve; a stud carried by said keeper and designed to operate in the other of said slots in said sleeve; a tripping plate in the form of a ring surrounding said tool and located adjacent said cutters, and means extending between said tripping plate and said cam-sleeve whereby said tripping plate is supported and movement thereof is transmitted to said sleeve, comprising a pair of threaded thrust-rods carried by said ring-plate and located at opposite sides of the tool and extending through lugs carried by said cam-sleeve, and nuts screwed on said rods and jammed against the opposite sides of their associated lugs, as set forth.

5. A tool of the class described, comprising a bore-provided body provided with a head having a chamber extending longitudinally thereof; a plurality of cutters adapted to tap tapered holes mounted in said head; a plunger mounted in said bore and adapted to co-act with said cutters so as to move them radially inwardly and outwardly; elastic means for actuating said plunger; resetting means associated with said cutters; a keeper, having a beveled face, mounted to be moved around the axis of said tool and with which said re-setting means co-acts during tapping; an adjusting-nut embracing said body and adjustable thereon and adapted to be coupled to said keeper so that said keeper may be adjusted longitudinally of the tool, and adjustable means moved longitudinally of the tool by the work and adapted to move said keeper out of the path of movement of said re-setting means to permit of the collapse of said cutters through the action of said elastic means.

PETER JARDINE.